Aug. 30, 1966   M. V. MALLOW   3,269,166
SLUG PREPARATION FOR A COLD EXTRUSION
Filed Nov. 8, 1961

MAX V. MALLOW
INVENTOR.

BY John R. Faulkner
Thomas H. Oster
ATTORNEYS

United States Patent Office 3,269,166
Patented August 30, 1966

3,269,166
SLUG PREPARATION FOR A COLD EXTRUSION
Max V. Mallow, Detroit, Mich., assignor to Ford Motor Company, Dearborn, Mich., a corporation of Delaware
Filed Nov. 8, 1961, Ser. No. 151,040
2 Claims. (Cl. 72—343)

This invention relates to the making of slugs of uniform weight and volume directly from hot-rolled bar stock. More particularly, this invention relates to the preparation of slugs for use in a cold forming process. This preparation includes the steps of shearing, upsetting and trimming hot-rolled bar stock.

A method commonly used for slug preparation is cutting cold-finished bars with a saw or machine tool. The foregoing method is characterized by high cost of material per pound, considerable waste of material caused by the tool cut and long cycle time.

In accordance with the instant invention, slugs are directly sheared from hot-rolled stock. The sheared slugs are then upset by a tapered punch forming a slug which has a body of a desired weight and volume and having, in addition, a radial flash. Finally, the radial flash is removed, resulting in a slug having the desired volume and weight. The foregoing operations can all be accomplished in a mechanical press which is relatively low in cost and high in productive capacity. The improved method also has the advantage of producing slugs from hot-rolled stock which is a low-cost material. Further, the slugs are produced with a minimum of material waste and are substantially uniform in weight and volume.

It is therefore the general object of this invention to provide an improved method and apparatus for producing slugs.

Another object of the invention is to provide an improved method and apparatus for producing slugs to be used in forging processes, and particularly in cold forging processes.

Another object of the invention is to provide an improved method and apparatus for consistently roducing slugs of given dimensions and weight.

Another object of the invention is to provide an improved method and apparatus for producing slugs of given dimensions and weight from hot-rolled stock.

Another object of the invention is to provide an improved method and apparatus for producing slugs with a minimum of material waste.

Another object of the invention is to provide an improved method and apparatus capable of making slugs at a high rate of production.

Another object of the invention is to provide an improved method and apparatus capable of making slugs wherein a press can be used to perform all of the material-forming operations.

Other and more detailed objects and advantages will become apparent in the ensuing portion of this specification, which, in conjunction with the accompanying drawings, discloses the preferred embodiment and procedure for producing slugs. It should be understood that the description which follows is exemplary only and is not limiting in nature.

The shearing of the hot-rolled bar stock to obtain a slug is performed by a press having a moving shearing die or blade. The press used for shearing can be any of the well-known presses such as that shown in United States Patent No. 2,698,951. The selection of a particular press is in large dependent on the material being sheared and the design characteristics of the shear die used. These variables are discussed in greater detail in "Plastic Working in Presses," by E. V. Crane, published by Wiley and Sons (third edition, 1944) pages 25–50, 63–67, 458–462 and 476–487.

A predetermined length of the hot-rolled bar is fed into the shear die of the press by a feed device. The feed device can be manually or automatically operated. Once the predetermined length of the bar has been placed in the shearing die, the remaining portion of the hot-rolled bar is held rigidly in the press frame and the hot-rolled bar is severed by the shearing die being actuated by the press to move relative to the press frame.

Figure 2:
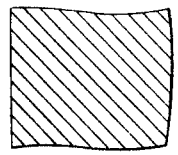
FIGURE 2 is an axial cross section of a slug following a shearing operation in accordance with the invention.

FIGURE 2 shows an axial cross section of the slug following completion of the shearing operation. The shearing operation distorts the slug as shown in FIGURE 2. Further, due to feed variations and dimensional variation of the hot-rolled bar, the slugs removed from the shearing operation vary in volume and weight. The purpose of the upsetting operation is to form a slug having a body of a given weight, volume and geometry and to form a radial flash of any excess material.

Figure 1:
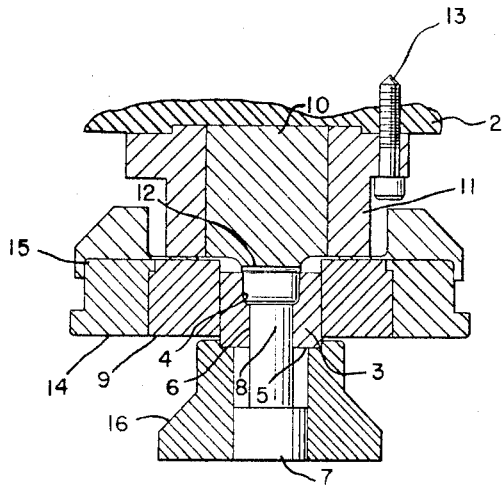
FIGURE 1 is a side view in section of a portion of the punch and die utilized to upset the slug.

Following the completion of the shearing operation the severed slug is removed from the shearing press and sprayed with sufficient lubricant to form a thin film. Referring to FIGURE 1, the lubricated slug 1 is then placed in the insert die 3 of the upset press 2. The insert die 3 has a cavity 4 which has been dimensioned according to the slug size and shape desired. The insert die 3 is placed in shrink ring 9 and is located therein so that the insert die 3 will receive maximum lateral support at the regions of highest stress. Shrink ring 9 is connected to the press frame by means of outside shrink ring 14 and die set-up ring 15. The insert die end 5 has a hole 6 located to receive ejector 7. Ejector 7 reciprocates in rest block 16 and die insert hole 6 and has an end 8 which abuts the bottom of the slug when the slug is placed in the insert die. The insert die 3 is supported on rest block 16. Located above the insert die is the punch 10 which is placed in shrink ring 11 and is attached to the press by bolts 13.

Figure 3:
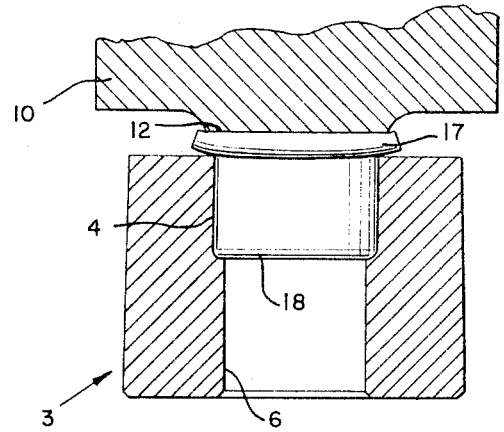
FIGURE 3 is an axial cross section of a slug of FIGURE 2 following an upsetting operation in accordance with the invention.
Figure 5:
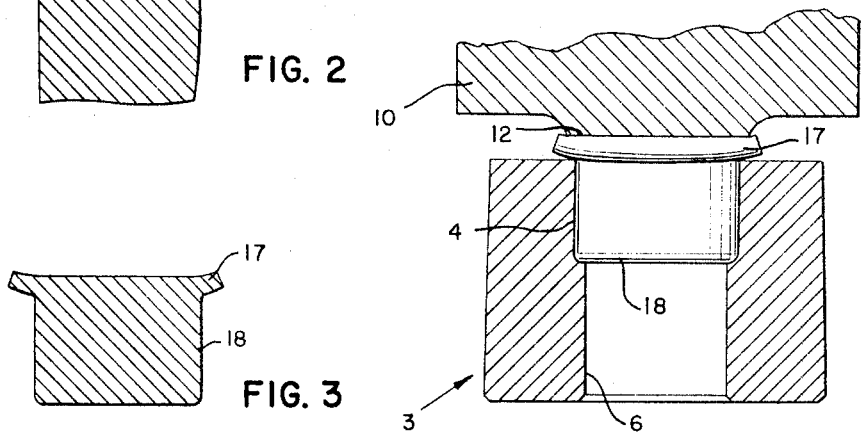
FIGURE 5 is an enlarged section of a portion of the punch and die.

Referring to FIGURE 5, punch body 10 tapers to punch end 12. The taper causes any excess material which is expelled from the cavity to form a radial flash 17 which extends beyond the slug body. FIGURE 3 shows the radial flash 17 and slug body 18 following the upsetting operation. The forming of the radial flash permits any excess slug material to be easily removed from the slug body. The punch end 12 which contacts the slug has approximately the same diameter as the diameter of insert cavity 4. The diameters are so chosen to allow excess slug material to be freely expelled from the die cavity and to minimize the coining resistance caused by the punch end 12 pressing away excess material which flows from the die cavity against the upper surface of insert die 3. If the diameter of the punch is not properly proportioned relative to the die cavity diameter, the coining resistance will increase according to the amount of excess slug material expelled from the insert die. The volume and weight of the slug body will vary, therefore, according to the amount of excess slug material. In experimental tests, a die cavity diameter of 1.281 inches and a punch end diameter of 1.285 inches proved satisfactory.

It should be understood that it is within the broad scope of the invention to use a punch that is not tapered or radiused. The flash resulting from a cylindrical punch will tend to be cylindrical and parallel to the punch travel rather than radial and normal to the punch travel.

In performing the upsetting operation, the press is actuated causing the punch to strike the slug which has been placed in the die cavity. This striking causes any excess slug material to be expelled from the die cavity in the form of a slug flash. Following the striking by the punch, the ejector 7 is actuated thereby removing the upset slug from the die cavity. Press loads of 400 to 500 tons at the press stops have proved satisfactory for upsetting hot-rolled SAE 8620 with a Brinell hardness 228. FIGURE 3 shows an axial cross section of the slug following the completion of the upsetting operation.

Figure 4:
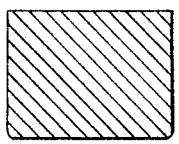
FIGURE 4 is an axial cross section of a slug of FIGURE 3 following a trimming operation in accordance with the invention.

The trimming of flash is a well-known operation and is considered in greater detail in "Plastic Working in Presses," by E. V. Crane, published by Wiley and Sons (third edition, 1944) pages 67–73, 458–462 and 476–481. If the flash to be trimmed is radial, the trimming tool will move parallel to the axis of the slug body. If the flash to be trimmed is cylindrical, the trimming tool will move perpendicular to the axis of the slug body. The configuration of the slug following the removal of a radial flash by a trimming operation is shown in FIGURE 4.

In summary, the improved method comprises the steps of shearing a hot-rolled bar to obtain an approximate slug size; upsetting the sheared slug to form a slug body of given dimensions and weight and to form a flash consisting of excess material; and trimming the flash caused by the upset operation, thereby removing any excess slug material and obtaining slugs of substantially constant volume and weight.

In experimental tests, the foregoing method has proven most satisfactory. The method has been used to form slugs from 1¼ inch diameter hot-rolled SAE 8620 bars Brinell hardness 228. In forming slugs from SAE 8620 bars, the sheared slug weight was varied from 148 grams to 164 grams. Following the trimming operation, the finally formed slugs were again weighed and the final slug weight varied from 146 grams to 146.5 grams. The slug shape substantially conformed to the shape of the die cavity.

It is to be understood that it is within the broad scope of the invention to perform the foregoing method in one machine automatically or in a number of machines by manually operating and controlling means. Further, it is within the broad scope of the invention to operate at room or elevated temperature and at any pressure satisfactory and upon any material. The foregoing description is only by way of example and it is not limited to the particular method, apparatus or article produced thereby but it is to be considered as embracing all that fall within the scope of the appended claims.

I claim:

1. A method of preparing a deformable slug of substantially uniform weight and shape from a preform having an upper surface, said preform including a small, variable and unpredictable excess of material comprising: supporting the preform in a die cavity having a given diameter, said cavity supporting said preform so that the greater part of its surface is in contact with the surface of the cavity and so that the upper surface of said preform is exposed, causing a punch having a truncated conically-shaped end with a diameter slightly greater than the given diameter of said cavity to exert a deforming pressure upon said slug preform.

2. A method of preparing a deformable slug of substantially uniform weight and shape from a preform having an upper surface, said preform including a small, variable and unpredictable excess of material comprising: supporting the preform in a die cavity having a given diameter, said cavity supporting said preform so that the greater part of its surface is in contact with the surface of the cavity and so that the upper surface of said preform is exposed, causing a punch having a truncated conically-shaped end with a diameter slightly greater than the given diameter of said cavity to exert a deforming pressure upon said preform resulting in the preform conforming to the shape of said die cavity and causing any excess preform material to be displaced from said die cavity in a direction normal to the movement of the punch.

References Cited by the Examiner

UNITED STATES PATENTS

| | | | |
|---|---|---|---|
| 1,456,597 | 5/1923 | Hughes | 29—556 |
| 1,738,567 | 12/1929 | Flodin. | |
| 2,991,552 | 7/1961 | Chatfield | 29—556 |
| 3,131,472 | 5/1964 | Turner | 29—556 X |

JOHN F. CAMPBELL, *Primary Examiner.*

HYLAND BIZOT, WHITMORE A. WILTZ, *Examiners.*

J. C. HOLMAN, J. D. HOBART, *Assistant Examiners.*